US011831143B1

(12) United States Patent
Krause et al.

(10) Patent No.: US 11,831,143 B1
(45) Date of Patent: Nov. 28, 2023

(54) CIRCUIT BREAKER FORENSICS FOR POWER DISTRIBUTION UNITS

(71) Applicant: Legrand DPC, LLC, Reno, NV (US)

(72) Inventors: Christian Krause, Zwickau (DE); Danny Baumann, Neukirchen (DE); Michael Suchoff, Palm Beach, FL (US); James P. Maskaly, Reno, NV (US); Paul Mott, Somerset, NJ (US)

(73) Assignee: LEGRAND DPC, LLC, West Hartford, CT (US)

( * ) Notice: Subject to any disclaimer, the term of this patent is extended or adjusted under 35 U.S.C. 154(b) by 0 days.

(21) Appl. No.: 18/155,639

(22) Filed: Jan. 17, 2023

(51) Int. Cl.
*H02H 3/08* (2006.01)
*H01R 25/00* (2006.01)
*H01R 13/66* (2006.01)

(52) U.S. Cl.
CPC ........... *H02H 3/08* (2013.01); *H01R 13/6683* (2013.01); *H01R 25/003* (2013.01)

(58) Field of Classification Search
CPC .......... H02H 3/08; H02H 3/033; H02H 3/025; H02H 3/105; H02H 3/20; H01R 24/525; H01R 13/6683
USPC .................................... 361/86–87, 93.7–93.9
See application file for complete search history.

(56) References Cited

U.S. PATENT DOCUMENTS

| | | | |
|---|---|---|---|
| 8,558,710 B1* | 10/2013 | Nitz | H02G 3/18 340/657 |
| 9,703,342 B2* | 7/2017 | Nicholson | G06F 1/266 |
| 9,952,261 B2 | 4/2018 | Ewing et al. | |
| 2006/0012931 A1* | 1/2006 | Engel | H02H 1/0015 361/93.1 |
| 2017/0125984 A1* | 5/2017 | Mergener | H02J 13/00026 |
| 2018/0366885 A1* | 12/2018 | Hewitt | H01R 27/02 |
| 2020/0106221 A1* | 4/2020 | Lee | G06F 1/28 |
| 2020/0176968 A1* | 6/2020 | Ling | H02H 3/025 |

* cited by examiner

*Primary Examiner* — Danny Nguyen
(74) *Attorney, Agent, or Firm* — Perkins Coie LLP

(57) ABSTRACT

Disclosed are power distribution systems and methods in which a power distribution unit (PDU) is provided with an overcurrent protection device and per-outlet current sensing at each of the multiple electrical outlets of the PDU. The described embodiments enable the identification of the electronic device connected to a specific outlet or electronic device that may have caused the overcurrent protection device to trip. The methods of outlet identification in a PDU having multiple electrical outlets includes detecting whether either a peak current or a half-cycle root mean square (RMS) current at each outlet has exceeded a selected threshold prior to the occurrence of the trip event associated with the overcurrent protection device.

18 Claims, 13 Drawing Sheets

US 11,831,143 B1

CIRCUIT BREAKER FORENSICS FOR POWER DISTRIBUTION UNITS

TECHNICAL FIELD

The present disclosure is generally directed to power distribution units, and more specifically, power distribution units that provide methods and systems to detect electrical outlets that have caused overcurrent protection device (OCPD) trip events.

BACKGROUND

A conventional power distribution unit (PDU) is an assembly of electrical outlets (also called receptacles) that receive electrical power from a source and distribute the electrical power to one or more separate electronic appliances. Each such PDU assembly has a power input that receives power from one or more power sources through a power cord of the PDU. The electrical outlets can be used to provide power to one or more electronic appliances plugged into the PDU outlets. PDUs are used in many applications and settings such as, for example, in or on electronic equipment racks.

BRIEF DESCRIPTION OF THE DRAWINGS

A further understanding of the nature and advantages of the present technology may be realized by reference to the following drawings. In the appended figures, similar components or features may have the same reference label.

DETAILED DESCRIPTION

This description provides examples, and is not intended to unnecessarily limit the scope, applicability, or configuration of the invention. Rather, the ensuing description will provide those skilled in the art with an enabling description for implementing embodiments of the invention. Various changes may be made in the function and arrangement of elements. Thus, various embodiments may omit, substitute, and/or add various procedures or components as appropriate. For instance, aspects and elements described with respect to certain embodiments may be combined in various other embodiments. It should also be appreciated that the following systems, devices, and components may individually or collectively be components of a larger system, wherein other procedures may take precedence over or otherwise modify their application.

When using a power distribution unit (PDU), an overcurrent protection device (OCPD) may trip, and customers are interested in knowing why that happened, i.e., which electronic device, attached to a specific PDU outlet, caused the OCPD to trip, so that it can be replaced quickly to minimize downtime, and without having to conduct tests on each of the electrical outlets of the power distribution unit.

Embodiments of the disclosed technology are directed to a PDU with the capability to determine which of the multiple electronic devices connected to it may have been responsible for a trip event associated with the OCPD of the PDU. The described embodiments achieve this by using current sensors on a per-outlet basis to enable the detection of the specific electronic device that caused the trip event, thereby minimizing data center downtime and/or mitigating or eliminating electrical hazards. In one example, this is achieved by identifying a condition, e.g., an electrical outlet whose corresponding current sensor measures a current that is subsequently used to compute (e.g., by a microcontroller) a current characteristic that exceeds a specified threshold. In another example, if no outlet satisfies the condition, no trip cause will be reported. This may occur when the combined current of the electronic devices on a single electrical branch exceeds the OCPD trip current, but no single electronic device current exceeds the OCPD trip current. In yet another example, if multiple electrical outlets satisfy this condition, the one with the highest current characteristic that is identified will be reported as the one that caused the trip event of the OCPD.

Figure 1:
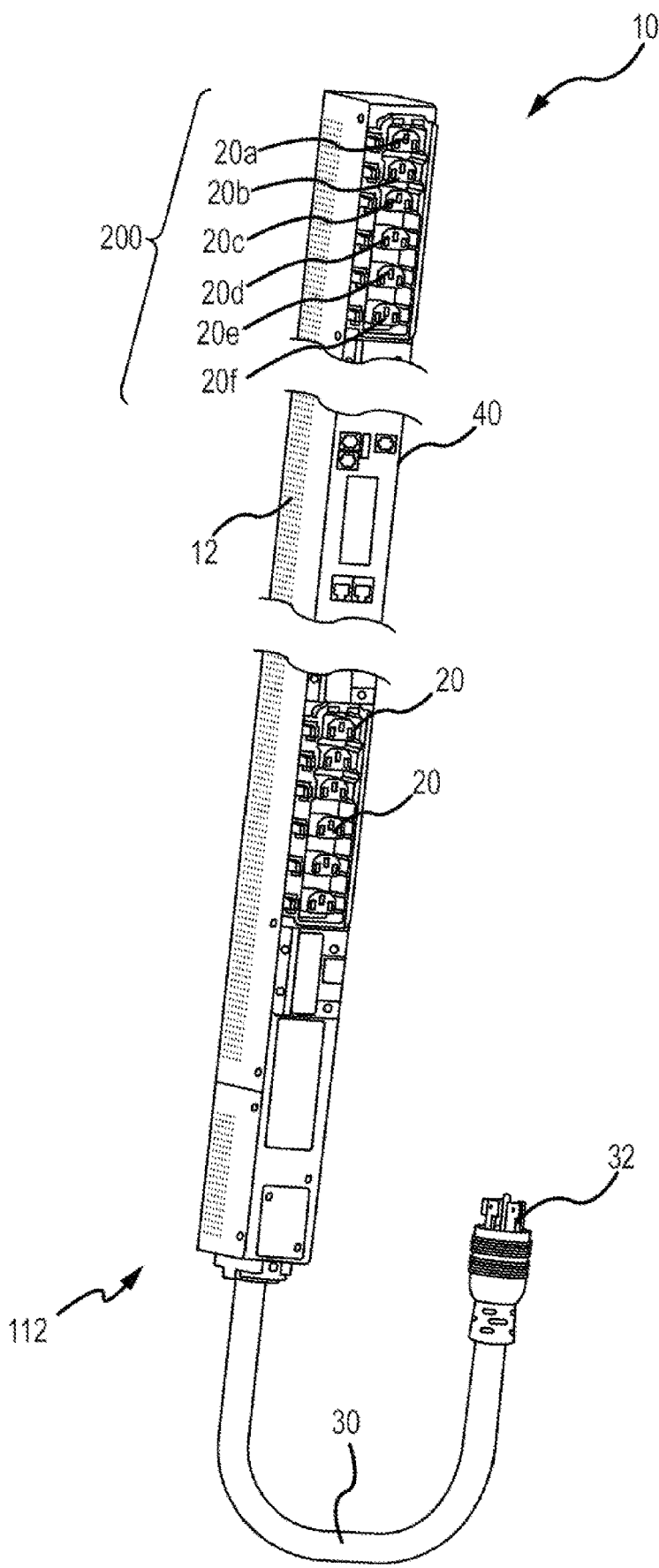
FIG. 1 is an illustration of an example power distribution unit (PDU).

Shown in FIG. 1 is an illustrative embodiment of a PDU 10 that includes a housing 12 with a plurality of outlets 20 (also called "receptacles", "outputs", "electrical outlets" or "power outlets") mounted therein to supply power to individual assets or devices, for example, assets that are used in operation of a data center. The assets may be mounted into an equipment rack and appropriately plugged into one of the outlets 20 of the PDU. Accordingly, the PDU 10 can be configured for mounting vertically or horizontally. To supply and distribute power to the connected assets through the outlets 20, the PDU 10 is configured for internal receipt of a power input. As shown, the PDU can include an internally wired input power cord 30 that extends externally and terminates with an associated plug 32 for connection to a power source in a traditional plug and receptacle connection. Alternatively, the PDU 10 can be configured to be internally hard wired to the external power source. The PDU 10 can include a visual display portion 40 to display monitored information, for example, an indication of which outlet of the PDU has detected excess current. The visual display can display other information such as, for example, power consumption, voltage, and/or current on a per outlet basis. Alternatively, or additionally, the PDU 10 can be coupled to an external display to convey such information. The outlets 20 can be grouped and configured to define one or more outlet modules 200 as described herein. For example, each outlet module 200 (also referred to as a "meter board") of the PDU 10 shown includes six outlets 20a-20f. It should be understood however that other embodiments of the outlet module 200 can include fewer or more outlets 20 provided that at least one outlet is configured with a current monitoring circuit and an overcurrent protection device in a manner as described herein.

Figure 2A:
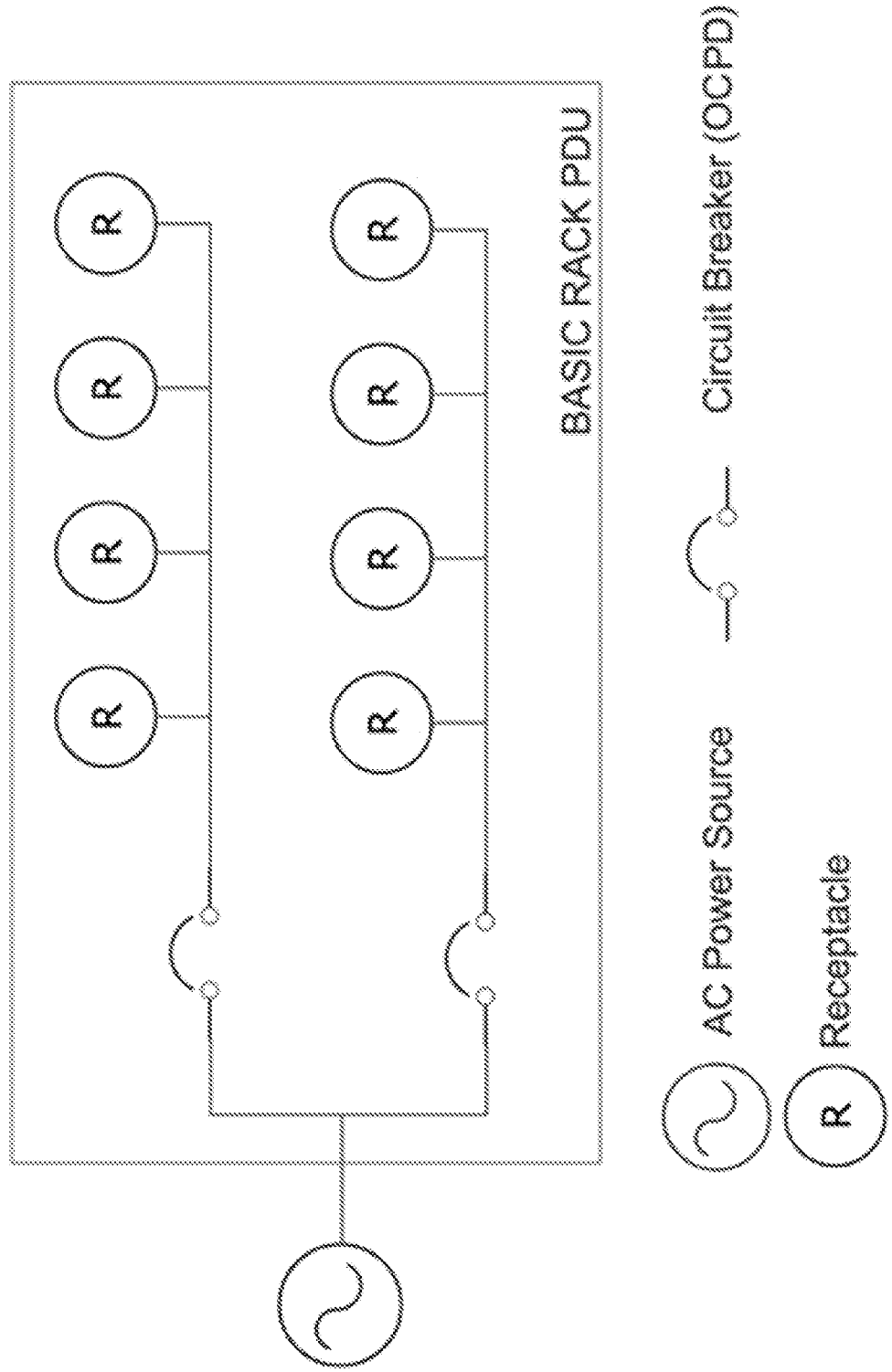
FIG. 2A is an example one-line wiring diagram of a basic rack PDU.

In existing implementations (e.g., as shown in FIG. 2A that depicts a simplified two-branch one-wire diagram), without the circuit breaker forensics described in this application, determining which electronic device connected to one of outlets was the cause of the trip event is a manual, time-consuming procedure. For example, this manual determination typically includes:

(1) turning off or disconnecting each of the electronic devices connected to the outlets;
(2) switching on the circuit breaker; and
(3) turning each of the electronic devices on (or connecting each of them to the PDU) in a sequential manner until the faulty device is located.

Furthermore, if the electronic device failure is a transient event, this manual procedure may not be able to reliably determine the faulty electronic device.

Figure 2B:
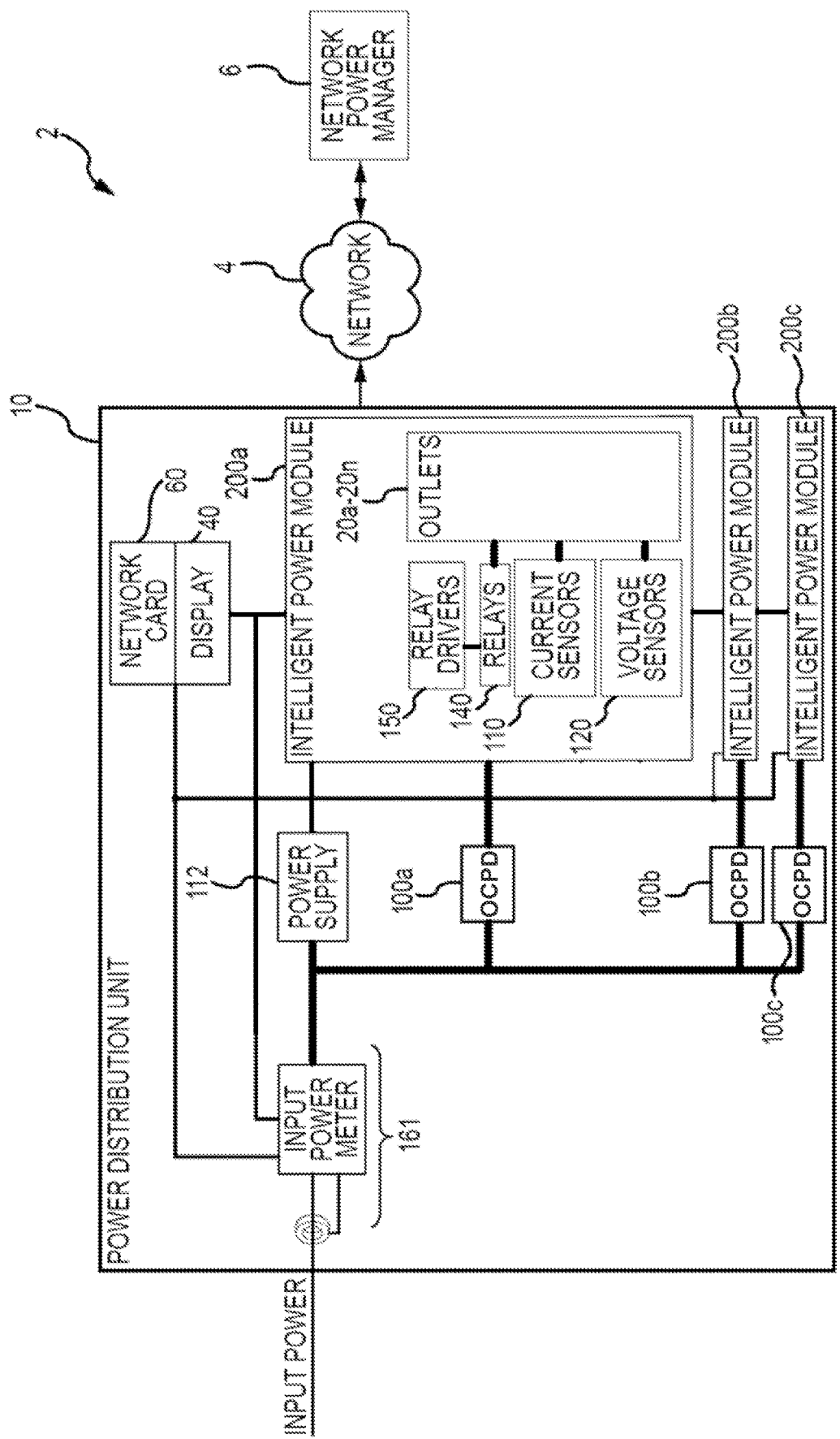
FIG. 2B is an example wiring diagram of the PDU of FIG. 1 connected to a power input and network.
Figure 2C:
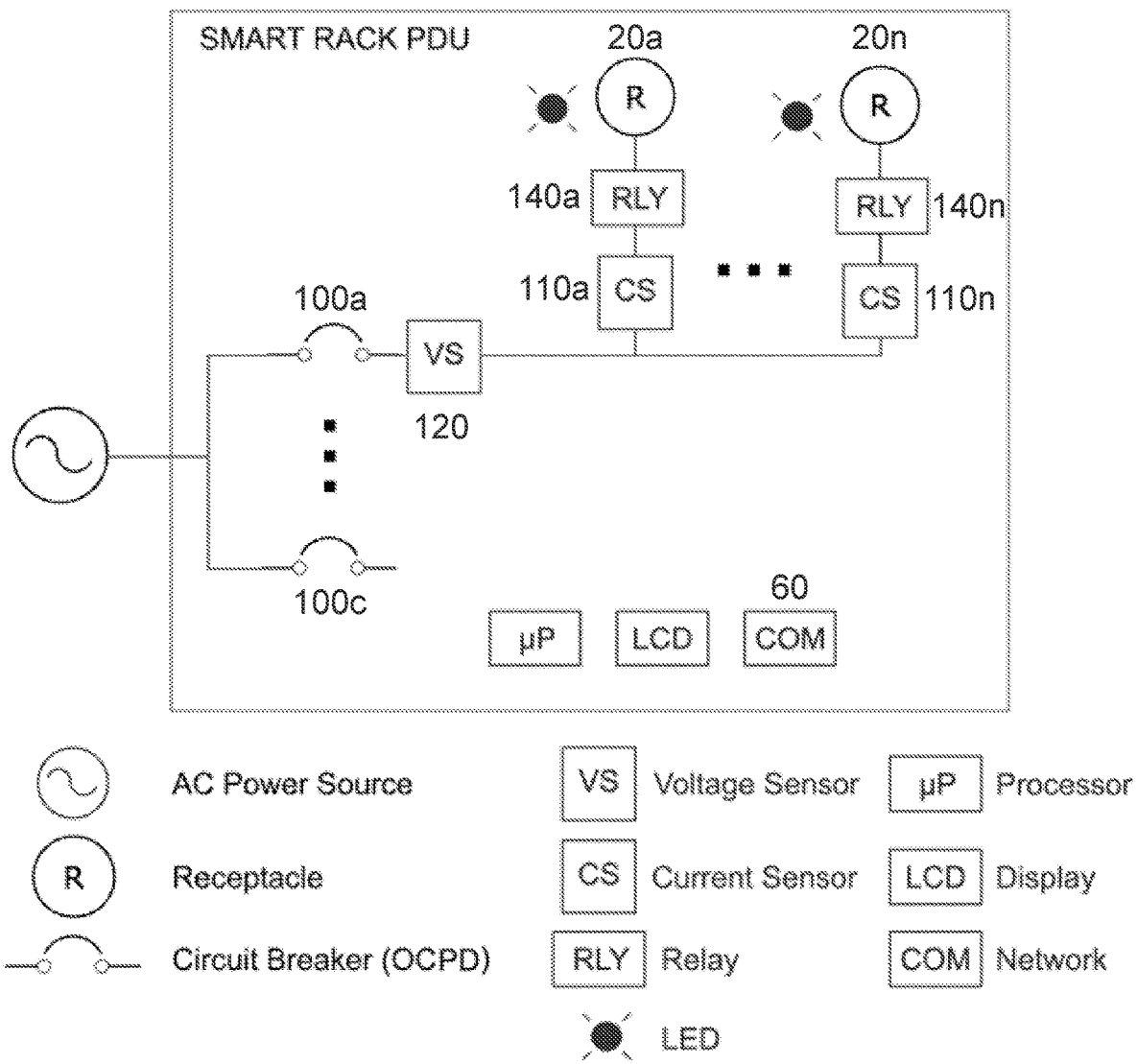
FIG. 2C is another example wiring diagram of the PDU of FIG. 1.

The disclosed embodiments, e.g., described in the context of FIGS. 2B and 2C, overcome the drawbacks associated with the manual determination described above by implementing circuit breaker forensics that use current sensors at each electrical outlet to measure the current therethrough, and automatically determine whether certain current characteristics have exceeded a predetermined threshold.

Shown in the block diagram of FIG. 2B is an illustrative system 2 that includes the PDU 10 to supply power to one or more associated computing assets, such as for example, devices of a computer network 4, which may include computing and processing assets within an enterprise data center. The PDU 10 can communicate over the computer network 4 with a data center operator or a networked application such as, for example, a power manager application 6 using a workstation or other device used in the management of the data center or other enterprise and is connected with the network 4. As schematically shown, an outlet module 200a of the PDU 10 is wired and configured with an overcurrent protection device 100a that acts as a fuse (or a common circuit breaker) and breaks down or creates an open circuit when the measured current exceeds a threshold due to one or more of the electronic devices that are connected to outlets 20a-20n of the modules 200a. This trip event removes power from all the electronic devices connected to outlets 20a-20n. In FIG. 2B, thick lines (e.g., from the input power meter 161 to each of the OCPDs and intelligent power modules) are representative of high voltage, whereas thin lines (e.g., to/from the network card 60) are low voltage connectors. In some embodiments, each of the modules 200a, 200b, 200c are wired and configured with their own overcurrent protection device 100a, 100b, 100c, respectively. In other embodiments, more than one module is connected to a single OCPD.

FIG. 2C shows an example one-line wiring diagram of a switched rack PDU that is implemented in accordance with the disclosed technology. As shown therein, each set of receptacles (20a, . . . , 20n, which correspond to devices plugged into the switched rack PDU) is connected to a corresponding voltage sensor 120 ("VS") and circuit breaker 100a ("OCPD"). Each receptacle (e.g., 20a) is configured with its own relay (e.g., 140a) ("RLY") and current sensor (e.g., 110a) ("CS"), which enables per-outlet current monitoring and switching. The PDU further includes a microcontroller ("µP"), a display ("LCD") and network communication capabilities 60 ("COM").

Embodiments of the disclosed technology enable the efficient identification of the electronic device that may have caused the trip event. In order to determine which of the electronic devices connected to electrical outlets 20a-20n may have caused the trip event, the described embodiments of the PDU 10 are configured to provide current sensing on a "per outlet" basis, e.g., each outlet has an associated current sensor 110. In one example, the current sensor 110 is configured to measure a signal representative of the current, which is then processed by a microcontroller (not shown in FIG. 2B and denoted "µP" in FIG. 2C) associated with the current sensor 110. In another example, the current signal from the current sensor 110 is sampled by the µP, e.g., 64 times per AC cycle and stores the past few seconds of measurements for analysis by a forensic algorithm that may be implemented in the microcontroller.

In some embodiments, when the PDU detects a circuit breaker trip (e.g., OCPD 100a indicates a trip event), the forensic algorithm is configured to determine the electronic device causing the trip event by examining the memory buffer of instantaneous current measurements. In an example, the current measurements are generated by sampling the signal (representative of current) from the current sensor. In some scenarios, the forensic algorithm computes the 1/2 AC cycle RMS current value from the memory buffer associated with each electronic device connected to each of outlets 20a-20n. In other scenarios, the forensic algorithm identifies the peak instantaneous current measurement from the memory buffer associated with each electronic device connected to each of outlets 20a-20n. In an example, the 1/2 AC cycle RMS current values from the memory buffer may be used when the circuit breaker trips in as little as 1/2 of an AC power cycle.

For the embodiments described herein, the microcontroller is configured to communicate detection of the current characteristic (e.g., the 1/2 AC cycle RMS current or the peak current) exceeding a threshold to the display 40 or otherwise communicate the detection of the current characteristic to a networked device or operator over the network 4 to address the issue with appropriate personnel. Accordingly, the PDU 10 includes an LCD display, one or more LED indicators, and/or a network interface card 60 for communication with devices on the network 4. Each outlet 20a-20n is further associated with a voltage sensor 120, and relays 140 and relay drivers 150, and it is noted that the relays 140 and relay drivers 150 are optional.

In some embodiments, an LED indicator located next to one or more electronic devices connected to outlets 20a-20n blinks and/or changes colors to indicate that those devices have lost power due to a tripped circuit breaker. A contrasting color and/or blink rate/pattern is used to indicate the specific electronic device that caused the circuit breaker trip. Additionally, or alternatively, a textual indication of the tripped circuit breaker and the failed electronic device is displayed on the PDU's LCD display. In some implementations, the LEDs are controlled by a first microcontroller that is different from a second microcontroller that controls the LCD display.

In some embodiments, an event notification of the circuit breaker trip event and/or the outlet that caused the trip event is transmitted by the PDU via a Simple Network Management Protocol (SNMP) trap. In other embodiments, the current measurements associated with each outlets and/or circuit breaker trip status can be polled remotely using SNMP or JavaScript Object Notation (JSON) formatted messages. In yet other embodiments, the PDU may be configured to support a web browser that can be used to determine the circuit breaker status and the current measurements.

In some embodiments, the PDU is configured to communicate the following information:
- an indication that an OCPD has tripped and/or corresponding details,
- the suspected outlet and/or an indication of the current characteristic exceeding the threshold, and
- a captured waveform of the trip event.

The information enumerated above can be communicated, for example, via:
- the display 40,
- the network card 60 to a network device and/or operator at the network 4,
- a web server,
- an SNMP query and/or traps,
- a command line interface (CLI), e.g., telnet or ssh,
- USB serial access and CLI to a local operator, and/or
- LED blink patterns next to the outlet.

Figure 3:
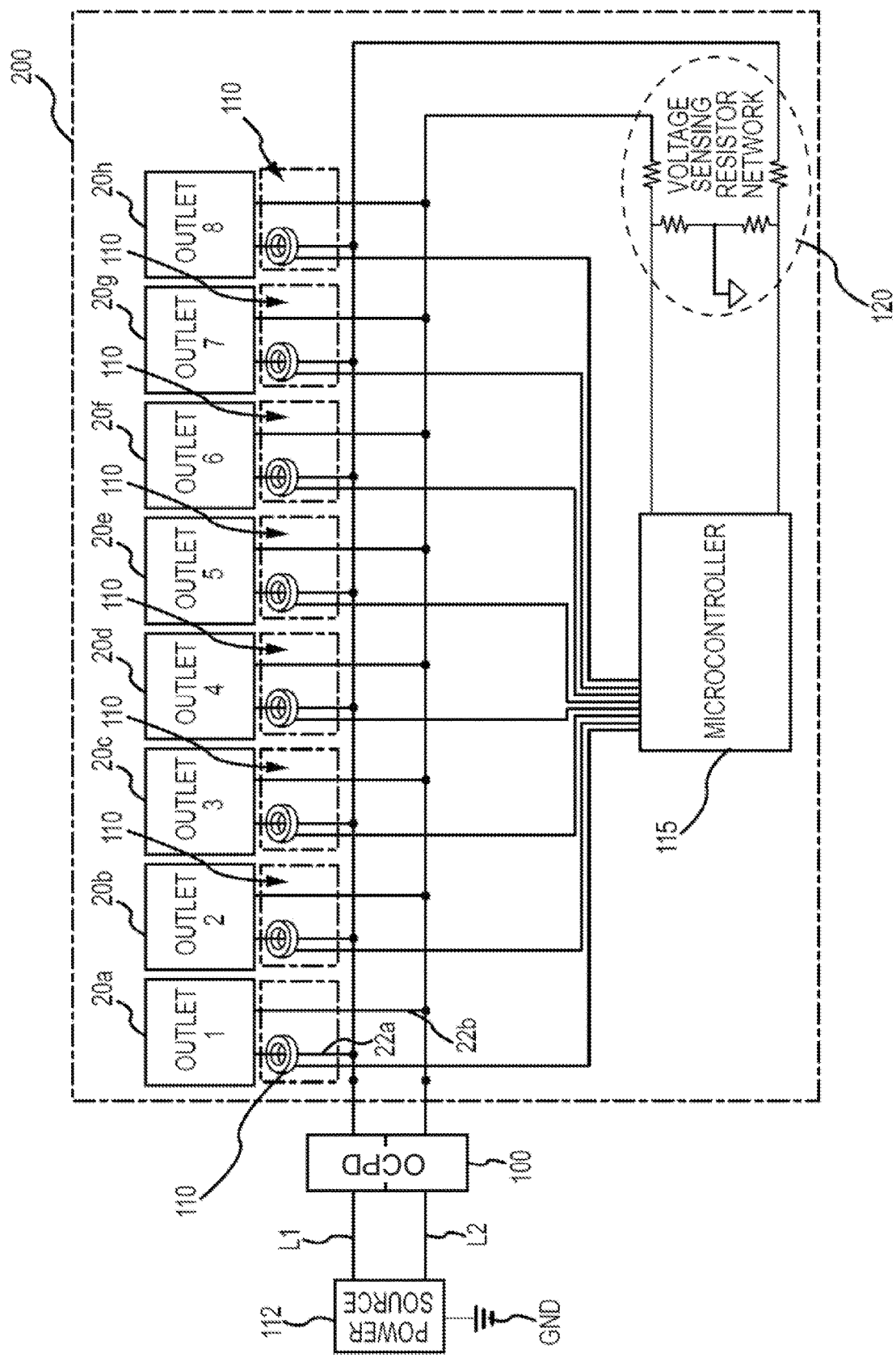
FIG. 3 is a block diagram of an example embodiment of an outlet module for use in the PDU of FIG. 1.

FIG. 3 shows a block diagram of an example outlet module 200 with per-outlet current sensors 110 electrically connected to an overcurrent protection device (OCPD) 100 and power supply or source 112 through a respective conductor of a plurality of conductors. The power source 112, which may be external to the PDU 10, is connected to the PDU 10 via its power cord, and carries one or more phases of a power input to the PDU 10. As shown, each outlet 20a-20h of the module 200 has two or more connectors 22 for electrically connecting to two conductors of the power source 112. Each outlet 20a-20h also includes an associated current sensor 110 that can measure the current for that electrical outlet. In some embodiments, the outlet module described herein can include a voltage sensing network 120 to determine voltage at each outlet 20a-20h along with other power related parameters as described herein. Each outlet 20a-20h is also connected to the ground GND in the power source 112, although these connections from outlets 20a-20h are not illustrated in FIG. 3. Furthermore, and different from FIG. 2B, the embodiments shown in FIG. 3 does not include relays or relay drivers associated with each electrical outlet 20a-20h.

Specifically shown in FIG. 3 is an illustrative embodiment of the module (or meter board) 200 electrically connected to two conductors L1, L2 of a power source 112. In the line-to-line distribution configuration of the PDU shown in FIG. 3, the first conductor L1 can be connected to one phase of AC power in the power source 112, and the conductor L2 can be connected to a second phase of AC power in the power source 112. Accordingly, the outlet module 200 can be configured with each outlet 20 having one connector 22a electrically connected to the first conductor L1 carrying a first phase of line power and the other connector 22b electrically connected to the second conductor L2 carrying a second phase of line power. As also shown in FIG. 3, the overcurrent protection device (OCPD) 100 is wired between the power source 112 and the module 200, and spans both L1 and L2. In this example of a single-phase power source, the OCPD comprises a single dual-pole ganged circuit breaker having connections to both L1 and L2. Herein, L1 or L2 can trip (or break) individually, but the OCPD 100 disconnects (or breaks) both conductors L1 and L2.

Alternatively, in a line-to-neutral distribution configuration of the PDU (not shown in FIG. 3), the conductors can be connected to different phases of the power source 112. Thus, for example, each outlet 20 of the module 200 can have one connector 22a electrically connected to the first conductor L1 carrying a first phase of line power and the other connector 22b electrically connected to the second conductor L2 connected to neutral. In this example, single pole OCPDs are used for each of the phases of a polyphase configuration of the power source 112.

In some embodiments, the current signal is continually measured by the current sensor and sampled by the processor on the network card, i.e., the network processor, to determine the current characteristic. As described herein, the network processor continually performs either the 1/2-cycle RMS current computation operation or the peak value determination operation based on the samples in the buffer. The most recent samples in the buffer prior to the trip event are examined after the trip event associated with a corresponding OCPD is detected. In an example, the trip event is detected when the voltage associated with each of the electrical outlets connected to the OCPD falls below a threshold, e.g., 75% of the nominal voltage value or within a 65%-85% range of the nominal voltage value. In an example, the specified threshold for the current sensor detection can be set to 125% of the OCPD rating.

In some embodiments, the 1/2-cycle root-mean-square (RMS) function can be used in the current computations performed by the microcontroller. In other embodiments, the peak amplitude may be used.

Figure 4:
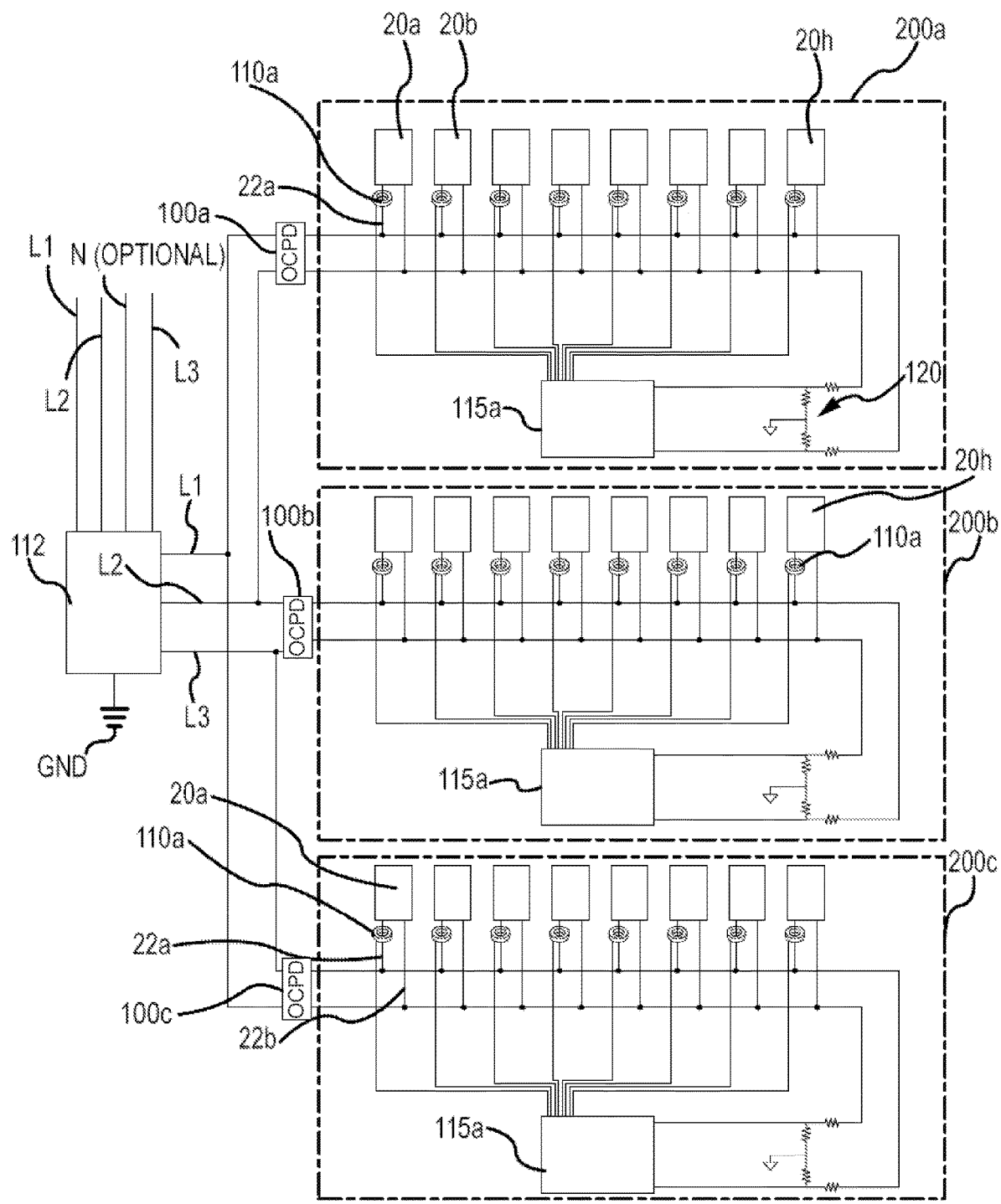
FIG. 4 is a block diagram of another example embodiment of multiple outlet modules for use in the PDU of FIG. 1.
Figure 5:
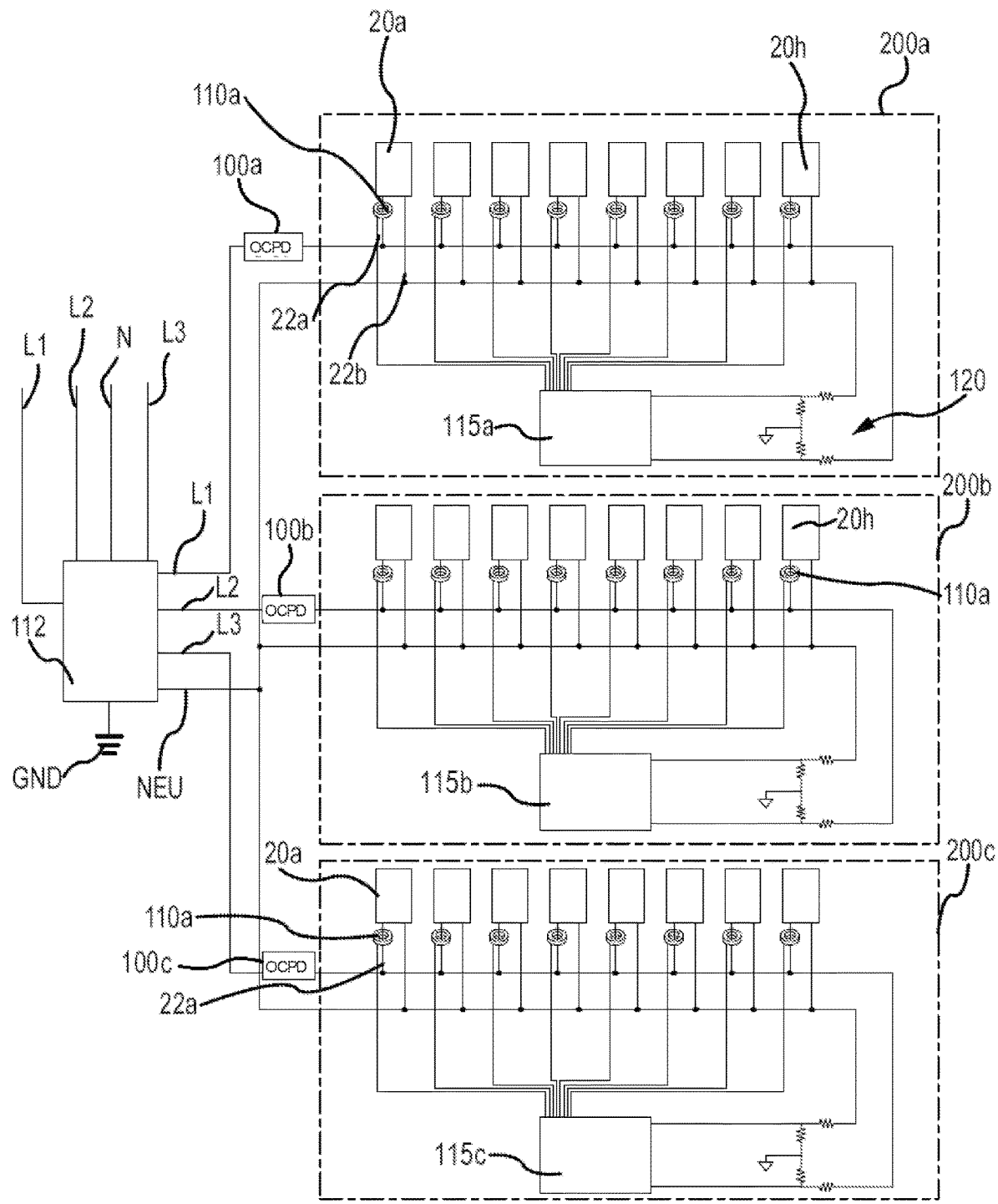
FIG. 5 is a block diagram of yet another example embodiment of multiple outlet modules for use in the PDU of FIG. 1.

In the case of a polyphase power source 112, the PDU 10 can have either a delta or a wye power output wiring configuration as shown in FIG. 4 and FIG. 5, respectively. As shown in FIG. 4, the polyphase power source 112 is connected to a three-phase delta-configured PDU. The PDU 10 of FIG. 4 shows three outlet modules 200a, 200b, 200c with outlets 20 electrically connected to the conductors L1, L2, L3 in varying combinations, and with individual OCPDs 100a, 100b, 100c spanning both conductors coming into a module.

In some embodiments, each module 200a, 200b, 200c includes a microcontroller 115a, 115b, 115c to receive the current signal from the respective associated current sensor 110a of each outlet 20. Time-series current measurements are generated by sampling the signal from the current sensor 110a, which enables the microcontrollers 115a, 115b, 115c to first determine a current characteristic (by either computing the 1/2 cycle RMS current or identifying the peak current), and then detect whether the current characteristic has exceeded a threshold for each outlet 20 of the respectively associated module 200a, 200b, 200c.

Shown in FIG. 5 is the polyphase power source 112 connected to a three-phase wye-configured PDU. The partial PDU illustrated in FIG. 5 shows the first connectors 22a of the outlets of the three outlet modules 200a, 200b, 200c respectively electrically connected to the conductors L1, L2, L3 with the respective overcurrent protection device (OCPD) 100a, 100b, 100c in between. The associated current sensor 110a for the first connector 22a in each outlet 20 detects the current flowing through the outlet. Again, each outlet module 200a, 200b, 200c includes a microcontroller 115a, 115b, 115c to receive the current sense outputs from the respective associated current sensor 110a of each outlet 20a-20h. The respective current sensor 110a continually measures the current signal, which can be used to determine whether the associated outlet is a cause of a trip event of the corresponding OCPD.

In some embodiments, the dual-pole "ganged" OCPD (or circuit breaker) in FIGS. 3 and 4 can be implemented using Part # J61-X0-26-127-K3D-D3 manufactured by Carling Technologies, and the single-pole circuit breaker (e.g., depicted in FIG. 5) can be implemented using Part # J62-X0-26-128-K3D-D3 manufactured by Carling Technologies.

In the embodiments described above, each of the microcontrollers on each outlet module (or meter board) is configured to sample the current signal, use the samples to determine the current characteristic, compare the current characteristic to a threshold, and report the result to the main controller (e.g., the network card 60 in FIG. 2B). Alternatively, each meter board may transmit the current characteristic to the main controller. In other embodiments, the main controller is configured to receive the current signal and perform the sampling, determining, and comparing operations.

Figure 6:
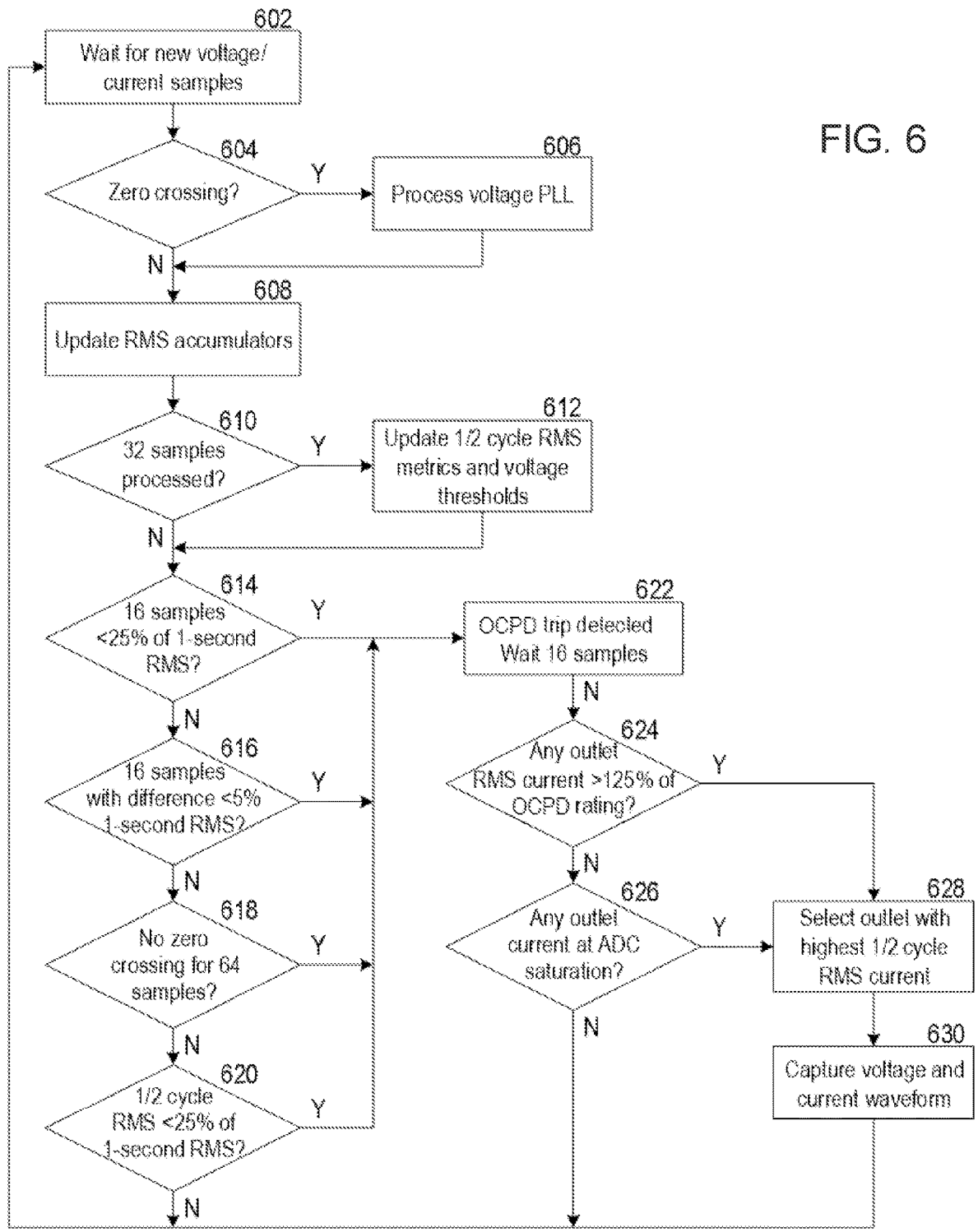
FIG. 6 is a flowchart of an example method for trip detection forensics.

FIG. 6 shows a flowchart of an example method for trip detection forensics that can be implemented by the meter board, e.g., output module 200*a* in FIG. 2B. As shown therein, the outlet (meter board) measures voltages and currents and continually updates voltage and current waveforms, respectively, to always store the latest 128 samples (corresponding to 2 AC cycles). Herein, a measurement includes 64 samples per AC cycle that are generated using an analog-to-digital converter (ADC). In an example, the microcontroller for the meter board is configured to calculate the average voltage and current RMS values over 1 second. The meter board continually scans for the failure of AC supply voltage by (a) determining a "failed voltage threshold" that is calculated as the larger of 20V or 25% of the last measured 1-second RMS value, and (b) indicating that the voltage has failed if any one of the following three conditions are satisfied:

- (i) checking single voltage samples to determine whether 16 consecutive samples are below the failed voltage threshold or the difference between 2 subsequent samples is below a threshold for 16 consecutive samples, where the threshold is calculated as the larger of 2V or 5% of the last measured 1-second RMS value. For example, if the most recent 1-second RMS value is 25V, then 5%×25V=1.25V, and the threshold is computed as max(2V, 1.25V)=2V; or
- (ii) checking for the presence of zero crossings (e.g., using a voltage phase locked loop (PLL)) to determine whether two zero crossings are absent at the expected time; or
- (iii) checking the half-cycle RMS voltage values to determine whether the half-cycle RMS is below the failed voltage threshold.

Once the voltage supply is determined to have failed (i.e., one or more of the three conditions above are satisfied), which in turn indicates an OCPD trip event, the meter board microcontroller determines a likely trip cause by:

- (i) waiting another 16 samples (1/4 AC cycle);
- (ii) for each outlet, determining the highest 1/2 cycle RMS current value, e.g., by scanning the signal from the current sensor;
- (iii) designating that an outlet is the potential trip cause if either
  - (a) the determined highest 1/2 cycle RMS current value exceeds 125% of the OCPD rating (i.e., an overload condition), or
  - (b) at least 2 of the current samples fully saturate the ADC (i.e., a short circuit condition). In an example, fully saturating the ADC corresponds to the sample taking on the maximum value in the data range for that sample;
- (iv) selecting, if there is more than one outlet that may be considered a potential trip cause, the outlet with the highest 1/2 cycle RMS; and
- (v) creating, after a suspected outlet has been identified, a snapshot of the current and/or voltage waveforms for that outlet.

In this embodiment, the microcontroller on the meter board will report the outlet ID of the suspected outlet, the 1/2 cycle RMS current value determined, and the waveform (s) to the main controller.

In some embodiments, the meter board may implement the algorithm described above using the peak current value as the current characteristic (instead of the 1/2 cycle RMS current value).

Figure 7:
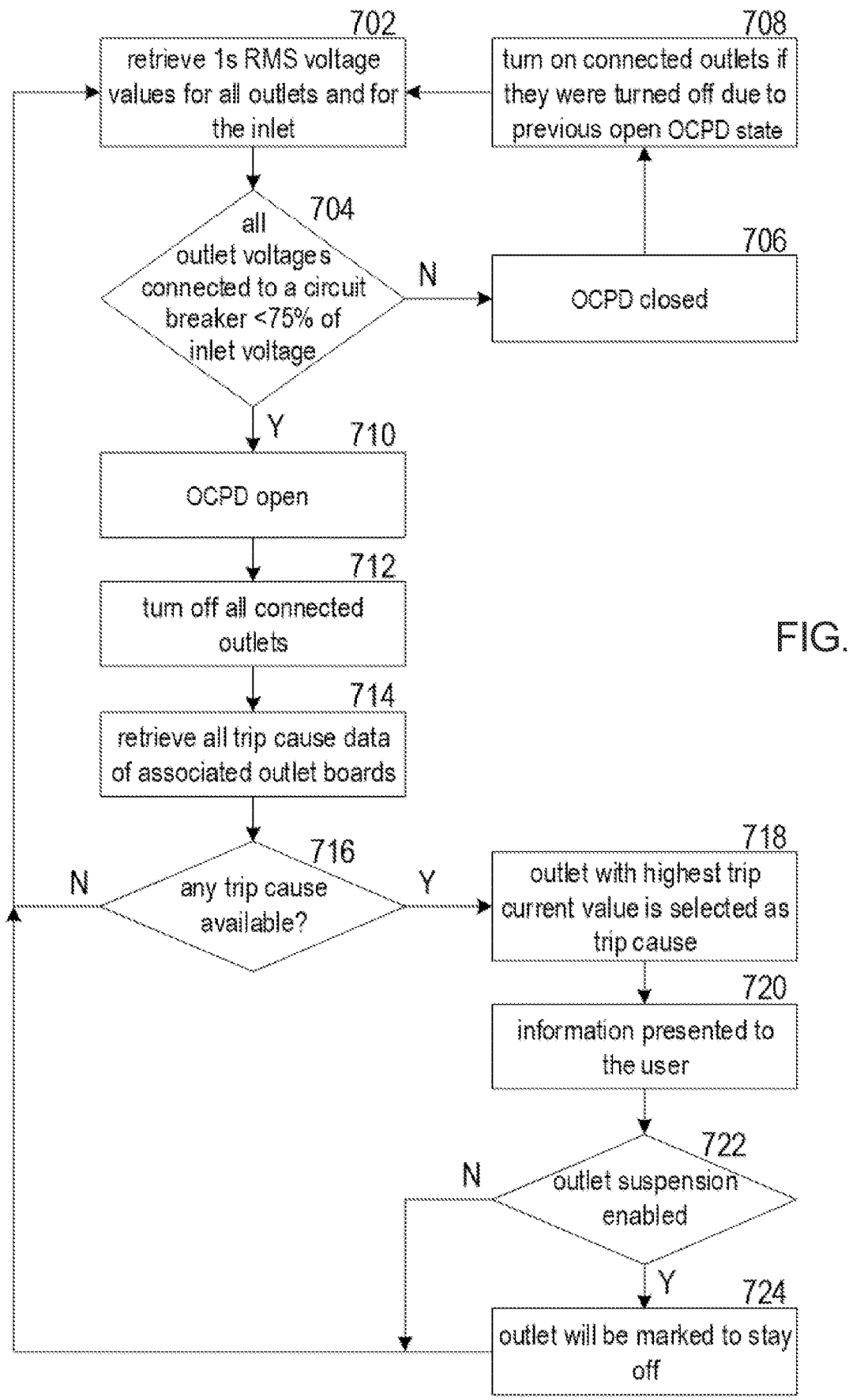
FIG. 7 is a flowchart of another example method for trip detection forensics.

FIG. 7 shows a flowchart of an example method for trip detection forensics that can be implemented by the main controller, e.g., network card 60 in FIG. 2B. As shown therein, the main controller will retrieve the voltage RMS value for each outlet every second. If the voltages for all outlets that are connected to a circuit breaker are lower than 75% of the inlet phase voltage feeding the circuit breaker, the main controller will consider the OCPD to be tripped or open. If this condition is not satisfied, the OCPD is considered to be closed, and any connected outlets that were turned off due to a previous open OCPD state are turned on. In some embodiments, the connected outlets are turned on only after an explicit reset command is received or after one or more administrator intervention actions have occurred.

At this time, the main controller searches the outlet boards (or meter boards) connected to the given circuit breaker for reported trip causes. The outlet with the highest reported current characteristic is reported to the user as the most likely trip cause. In an example, the reporting may be performed via a web-based graphical user interface (GUI) or a command line interface (CLI). In another example, the JSON-RPC is used. Finally, the waveform associated with the outlet that was the likely cause of the trip is retrieved.

Figure 8:
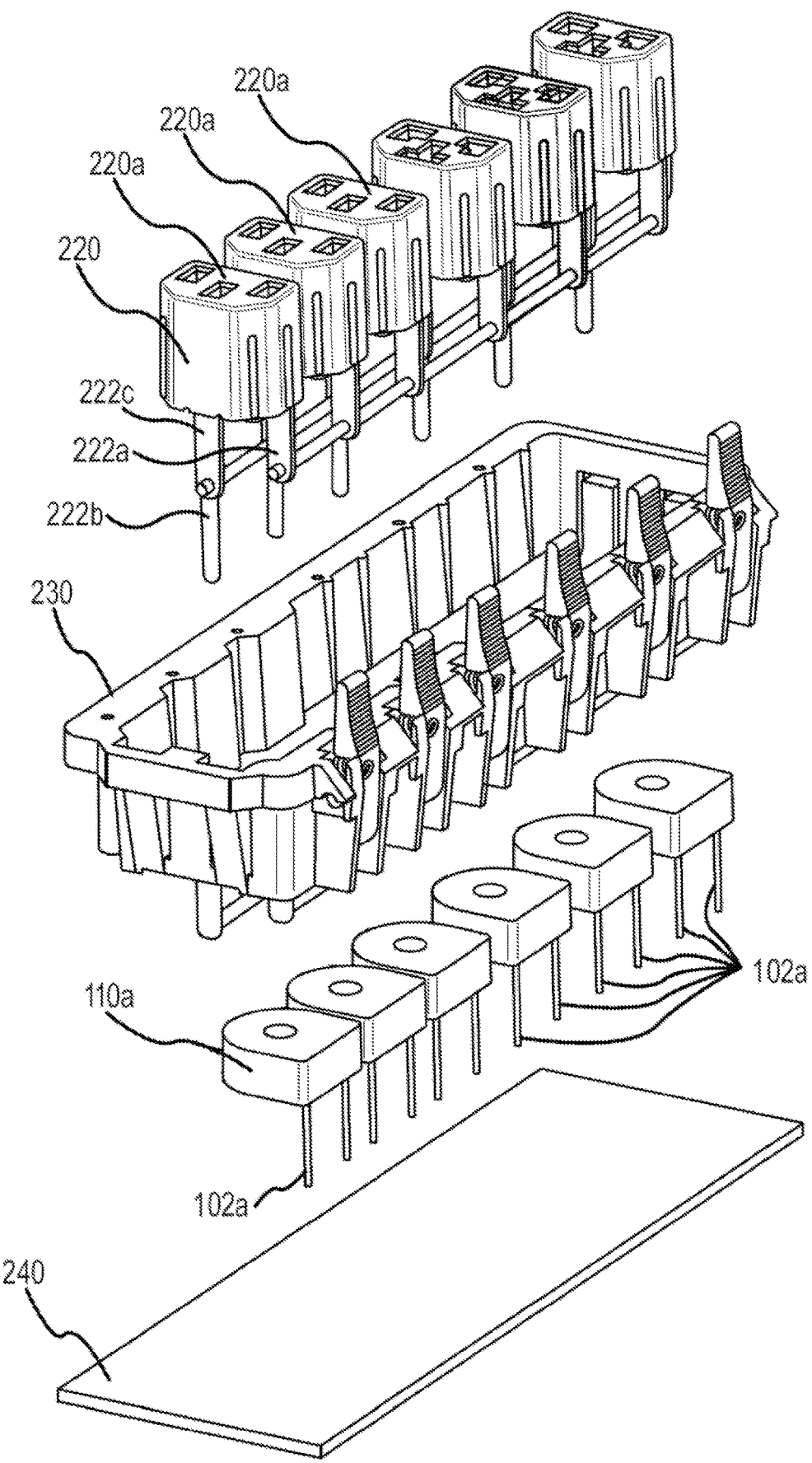
FIGS. 8 and 9 are various exploded perspective views of an example embodiment of an outlet module for use in the PDU of FIG. 1.
Figure 9:
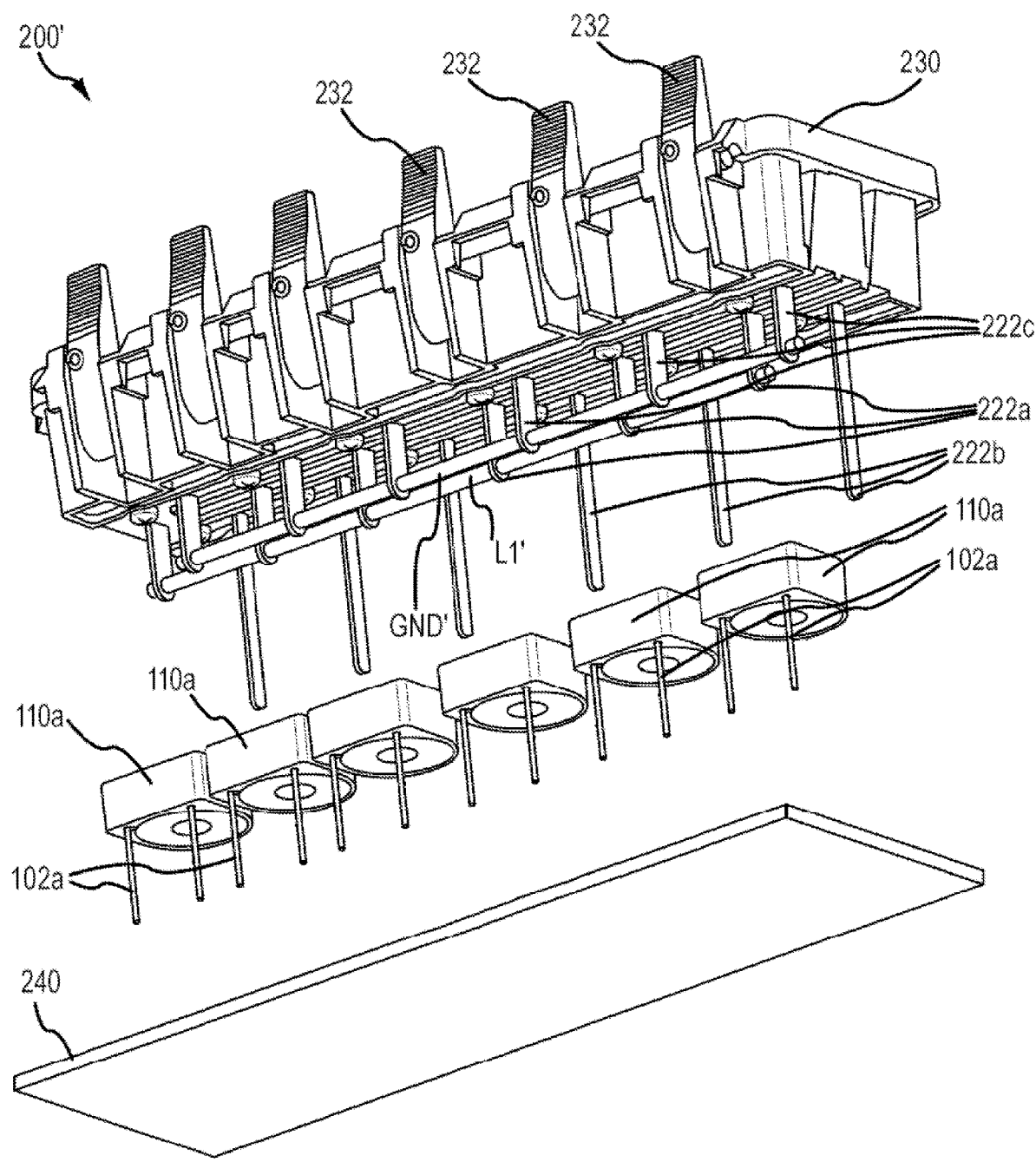

Shown in FIGS. 8 and 9 are two exploded views of an example module 200'assembled with six outlets 20'*a*-20'*f* disposed within a module tray or housing 230 and engaged with toroidal current sensors 110*a*. The current sensor 110*a* is mounted with its respective output leads 102*a* mounted to a printed circuit board PCB 240. Accordingly, the sensor 110*a* is disposed between the outlet cores 220 and the PCB 240, and more specifically, disposed between the module housing 230 and the PCB 240.

By providing the embodiments of PDU 10 with current monitoring and overcurrent protection as described herein, maintenance personnel can be provided with additional fault isolation information to allow them to correct a fault condition and restore the affected IT equipment with minimal impact to system uptime. In one example, the following isolation procedure can be implemented to restore power to all but the failed electronic device:

(1) when a trip event occurs and the failed electronic device is identified, the relay controlling power to the failed device is opened;
(2) the circuit breaker is reset to restore power to all the electronic devices except the failed device;
(3) the failed device is disconnected and replaced/repaired; and
(4) power is restored to the replaced/repaired device by closing its relay using either the PDU's local keypad/LCD or remotely via the PDU's web browser interface.

In some embodiments, and as with the PDUs of U.S. Pat. No. 9,952,261, embodiments of the PDU 10 can be configured with "Per Outlet Power Sensing" or ("POPS") which refers to the concept of detecting a load coupled to each outlet and monitoring power consumption at each outlet. Thus, because the microcontrollers 115 (e.g., as shown in FIGS. 3, 4 and 5) of the outlet modules receive current information for each outlet 20 of a module 200, along with voltage information, load current along with various power-related metrics can be calculated for each outlet and this information can be reported through the network 4 to the network power manager 6 or other network connected computer or device.

In some embodiments, the PDU can be configured to have latching relays.

In some embodiments, each electrical outlet 20 can be a metered outlet (which has a one or more sensors per outlet, each of which is associated with a display that is configured to display both a state and a reading corresponding to a measurement) or a switched outlet (which can be toggled on or off to selectively control current flow therethrough, and in an example, can be toggled by software).

In some embodiments, the microcontrollers 115 can be connected to a communications bus (such as an RS485 bus, I2C bus or SMBus). Embodiments of the PDU 10 can include a network interface card (e.g., network card 60) to report over the network 4. These measurements can be made by sensors on both metered outlets and switched outlets. These measurements may be received by an external system that collects the outlet information for which the data is provided and used to determine metrics or provide information such as described above.

In some embodiments, each of the switched electrical outlets in a PDU can be collectively configured to be either latching or non-latching, and the PDU is configured with an inrush (or in-rush) guard, which is a configurable minimum (delay) interval between two electrical outlets of the PDU being switched on. The goal of the inrush guard is to avoid overloading the inlet or the OCPD by the combined inrush current from many loads being switched on simultaneously. In the case of a latching relay where the relays have been configured to remain in their previous state upon loss of power, the inrush guard is not effective when unit power is restored. For PDUs with multiple inlets, the inrush guard can switch on outlets from each inlet at once. For inlets with two or three phases, the inrush guard can switch multiple outlets on at once, and in various combinations.

Embodiments of the disclosed technology provide a power distribution apparatus comprising a housing, a power inlet, a plurality of electrical outlets, wherein each of the plurality of electrical outlets (a) is adapted to provision power to an associated electronic device and (b) comprises an associated current sensor, at least one overcurrent protection device, and at least one processor coupled to the at least one overcurrent protection device and each associated current sensor, said at least one processor configured to receive a signal that represents current from each associated current sensor, compute, based on the signal, a current characteristic for each associated current sensor, detect a trip event associated with the at least one overcurrent protection device, and determine whether at least one computed current characteristic exceeds a selected threshold prior to detection of the trip event.

In some embodiments, the processor is the microcontroller (e.g., μP in FIG. 2C) on the metering board, which is distinct from the network interface card (e.g., network card 60 in FIG. 2B). In other embodiments, the processor is a network processor on the network interface card (NIC). In yet other embodiments, the processor is a microcontroller on the NIC, which also includes a network processor.

In some embodiments, upon determining that the at least one computed current characteristic exceeds the selected threshold, the at least one processor being further configured to correlate the at least one computed current characteristic to at least one of the respective associated current sensor or its associated electronic device.

In some embodiments, upon said at least one processor determining that a respective current characteristic exceeds the selected threshold prior to detection of the trip event, the at least one processor being further configured to identify a suspect electrical outlet or its suspect electronic device corresponding to the respective current characteristic, and transmit, to a location remote from the power distribution apparatus, an identifier associated with the suspect electrical outlet.

In some embodiments, upon said at least one processor determining that two or more respective current characteristics exceed the selected threshold prior to detection of the trip event, the at least one processor being further configured to identify two or more suspect electrical outlets or their suspect electronic devices corresponding to the two or more respective current characteristics, and transmit, to a location remote from the power distribution apparatus, an identifier associated with an associated electrical outlet of said two or more suspect electrical outlets that measured a highest value of the respective current characteristics.

In some embodiments, the at least one processor is further configured to transmit, to the location remote from the power distribution apparatus, a waveform capture corresponding to the signal from the at least one said associated current sensor.

In some embodiments, upon said at least one processor determining that each of the respective current characteristics does not exceed the selected threshold, said at least one processor is further configured to transmit, to a location remote from the power distribution apparatus, a message indicative of an absence of any of the plurality of electrical outlets being an individual cause of the trip event.

In some embodiments, the power distribution apparatus includes a voltage sensor, wherein detecting the trip event associated with the at least one overcurrent protection device is based on a signal that represents voltage from the voltage sensor.

In some embodiments, computing the current characteristic is based on sampling the signal from each associated current sensor.

In some embodiments, the trip event associated with the at least one overcurrent protection device corresponds to a voltage of at least one of the plurality of electrical outlets being less than a selected percentage or percentage range of a voltage of the power inlet. In an example, the selected percentage is 75%. In another example, the selected percentage range if from 65% to 85%.

In some embodiments, at least one electrical outlet of the plurality of electrical outlets is a switched electrical outlet that can be toggled on or off to selectively control current flow therethrough.

In some embodiments, said at least one processor is further configured to identify a suspect electrical outlet corresponding to the respective current characteristic, toggle the suspect electrical outlet to an off state, maintain the suspect electrical outlet in the off state, and toggle, upon a determination that an external reset command or administrator verification message has been received, the suspect electrical outlet to an on state.

In some embodiments, the current characteristic is representative of a half- cycle root mean square (RMS) current or a peak current.

Figure 10:
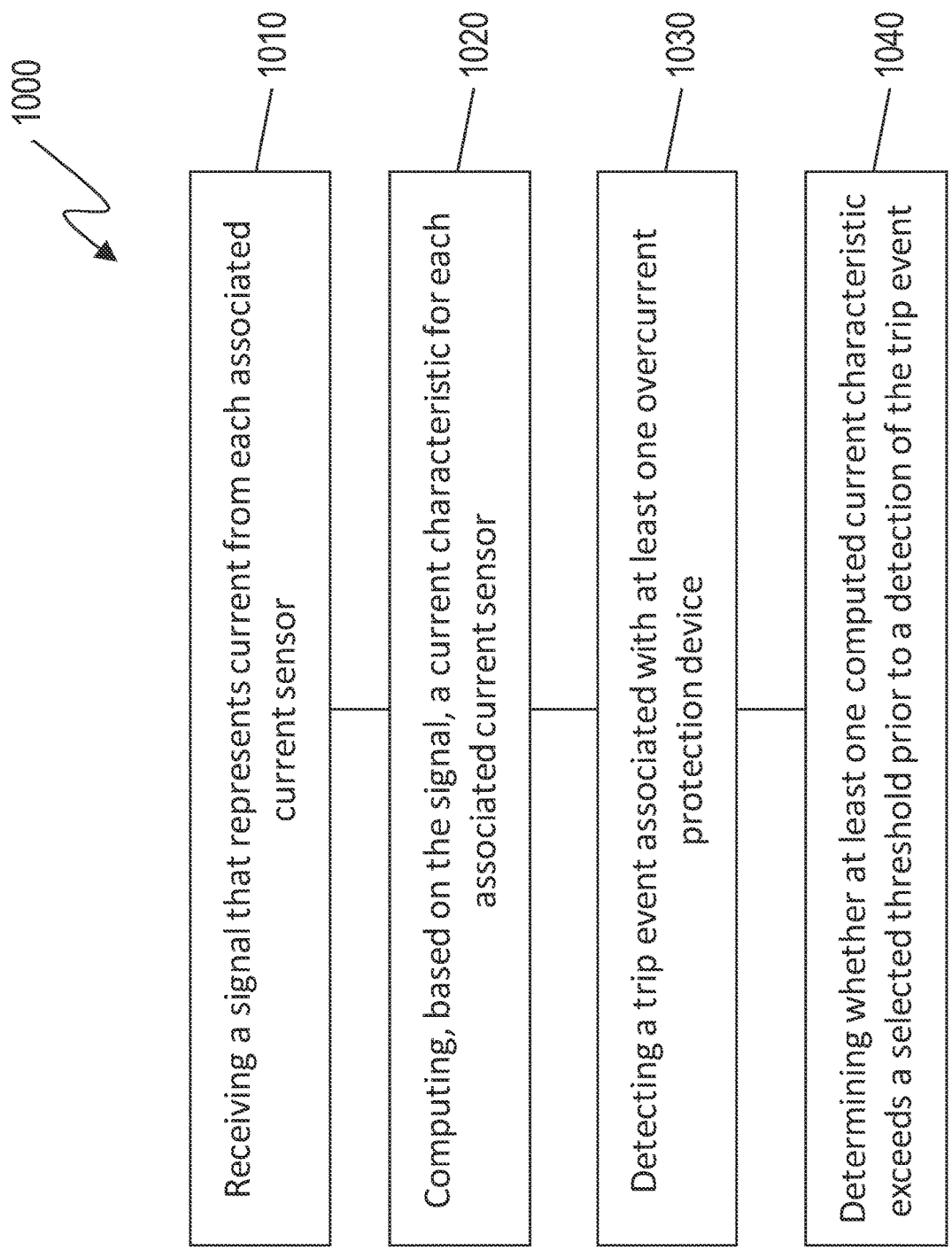
FIG. 10 is a flowchart of an example method for monitoring multiple electrical outlets of a power distribution apparatus and identifying whether an outlet caused a trip event associated with an overcurrent protection device of the power distribution apparatus.

Embodiments of the disclosed technology further provide a method of monitoring a plurality of electrical outlets of a power distribution apparatus, each of the plurality of electrical outlets being adapted to provision power to an associated electronic device and comprising an associated current sensor. As shown in FIG. 10, the method 1000 includes, at operation 1010, receiving a signal that represents current from each associated current sensor.

The method 1000 includes, at operation 1020, computing, based on the signal, a current characteristic for each associated current sensor. In an example, the signal is sampled and the current characteristic is determined based on the samples.

The method 1000 includes, at operation 1030, detecting a trip event associated with at least one overcurrent protection device.

The method 1000 includes, at operation 1040, determining whether at least one computed current characteristic exceeds a selected threshold prior to a detection of the trip event.

In some embodiments, the method 1000 includes the operations of determining that a respective current characteristic exceeds the selected threshold prior to detection of the trip event, identifying a suspect electrical outlet corresponding to the respective current characteristic, and providing, on the power distribution apparatus, a perceptible indication of the suspect electrical outlet. In an example, the perceptible indication is provided on a display on the power distribution apparatus. In another example, the perceptible indication is provided via one or more light emitting diodes (LEDs) on the power distribution apparatus.

Figure 11:
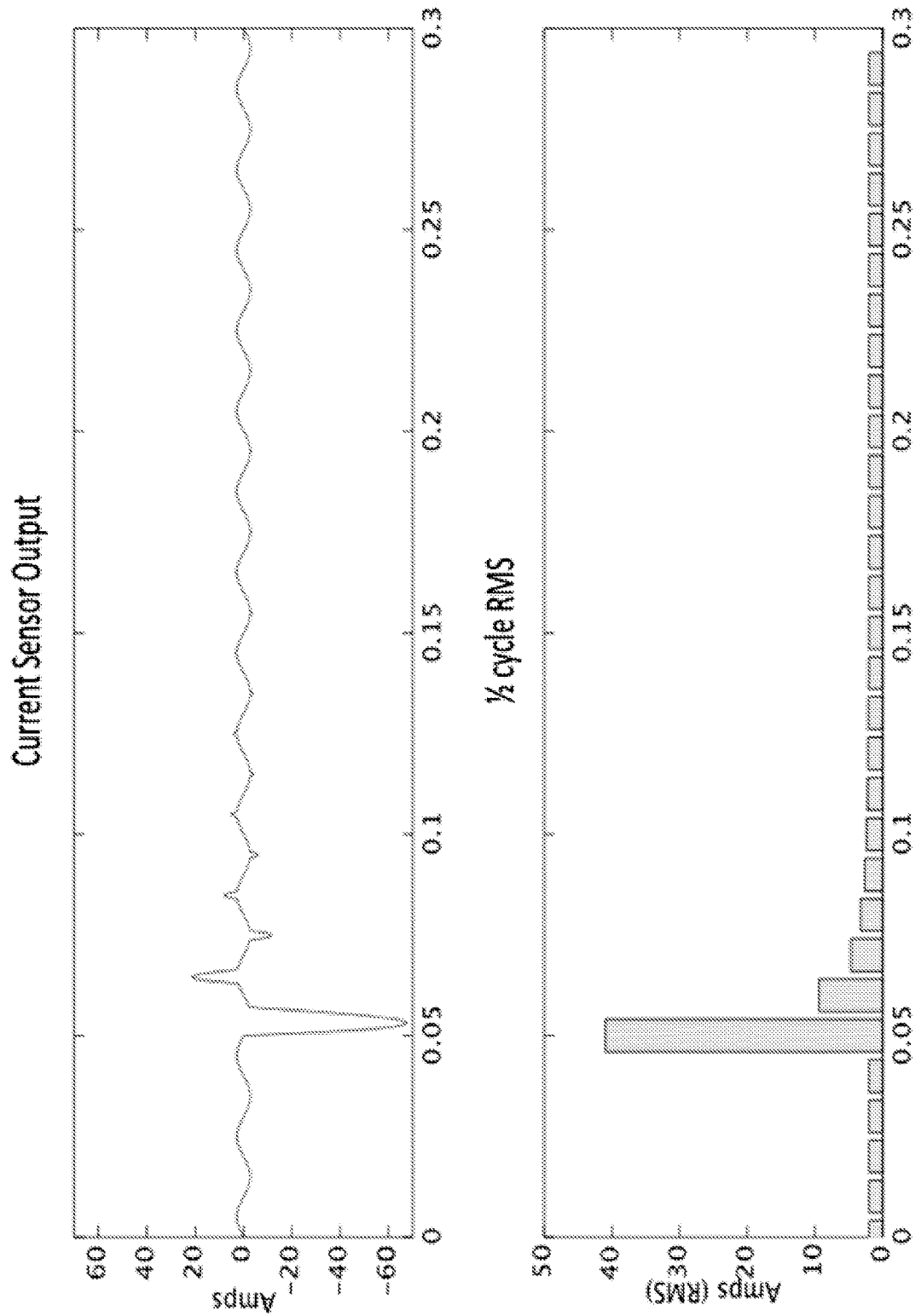
FIG. 11 is an example of an output of a current sensor and the corresponding computed 1/2 cycle RMS output.

In some embodiments, the current characteristic is representative of a half-cycle root mean square (RMS) current. An example of the current sensor output and the computed 1/2 cycle RMS is shown in FIG. 11. In other embodiments, the current characteristic is representative of a peak current.

Those of skill will appreciate that the various illustrative logical blocks, modules, circuits, and algorithm steps described in connection with the embodiments disclosed herein may be implemented as electronic hardware, computer software, firmware, or combinations thereof. To clearly illustrate this interchangeability, various illustrative components, blocks, modules, circuits, and steps have been described above generally in terms of their functionality. Whether such functionality is implemented as hardware, software, and/or firmware depends upon the particular application and design constraints imposed on the overall system. Skilled artisans may implement the described functionality in varying ways for each particular application, but such implementation decisions should not be interpreted as causing a departure from the scope of the present invention.

For a hardware implementation, the processing units may be implemented within one or more application specific integrated circuits (ASICs), digital signal processors (DSPs), programmable logic devices (PLDs), field programmable gate arrays (FPGAs), processors, controllers, microcontrollers, microprocessors, electronic devices, other electronic units designed to perform the functions described herein, or a combination thereof. For a firmware and/or software implementation, the methodologies may be implemented with modules (e.g., procedures, functions, and so on) that perform the functions described herein.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A power distribution apparatus, comprising:
a housing;
a power inlet;
a plurality of electrical outlets, wherein each of the plurality of electrical outlets (a) is adapted to provision power to an associated electronic device and (b) comprises an associated current sensor;
at least one overcurrent protection device; and
at least one processor coupled to the at least one overcurrent protection device and each associated current sensor, said at least one processor configured to:
receive a signal that represents current from each associated current sensor;
compute, based on the signal, a current characteristic for each associated current sensor;
detect a trip event associated with the at least one overcurrent protection device; and
determine whether at least one computed current characteristic exceeds a selected threshold prior to detection of the trip event, whereby:
upon determining that the at least one computed characteristic exceeds the selected threshold, said at least one processor is further configured to correlate the at least one computed characteristic to at least one of the associated current sensor or its associated electronic device, and
upon determining that the at least one computed characteristic does not exceed the selected threshold, said at least one processor is further configured to transmit to a location remote from the power distribution apparatus a message indicative of an absence of any of the plurality of electrical outlets being an individual cause of the trip event.

2. The power distribution apparatus of claim 1, wherein, upon said at least one processor determining that two or more respective current characteristics exceed the selected threshold prior to detection of the trip event, the at least one processor being further configured to:
identify two or more suspect electrical outlets or their suspect electronic devices corresponding to the two or more respective current characteristics; and
transmit, to a location remote from the power distribution apparatus, an identifier associated with an associated electrical outlet of said two or more suspect electrical outlets that measured a highest value of the respective current characteristics.

3. The power distribution apparatus of claim 1, wherein computing the current characteristic is based on sampling the signal from each associated current sensor.

4. A power distribution apparatus, comprising:
a housing;
a power inlet;
a plurality of electrical outlets, wherein each of the plurality of electrical outlets (a) is adapted to provision power to an associated electronic device and (b) comprises an associated current sensor;
at least one overcurrent protection device; and at least one processor coupled to the at least one overcurrent protection device and each associated current sensor, said at least one processor configured to:
receive a signal that represents current from each associated current sensor;
compute, based on the signal, a current characteristic for each associated current sensor;
detect a trip event associated with the at least one overcurrent protection device, wherein said trip event corresponds to a voltage of at least one of the plurality of electrical outlets being less than a selected percentage or percentage range of a voltage of the power inlet; and
determine whether at least one computed current characteristic exceeds a selected threshold prior to detection of the trip event.

5. The power distribution apparatus of claim 4, wherein the selected percentage range if from 65% to 85%.

6. The power distribution apparatus of claim 1, wherein at least one electrical outlet of the plurality of electrical outlets is a switched electrical outlet that can be toggled on or off to selectively control current flow therethrough.

7. The power distribution apparatus of claim 6, wherein said at least one processor is further configured to:
identify a suspect electrical outlet corresponding to the respective current characteristic; and
toggle the suspect electrical outlet to an off state.

8. The power distribution apparatus of claim 7, wherein said at least one processor is further configured to:
maintain the suspect electrical outlet in the off state; and
toggle, upon a determination that an external reset command or administrator verification message has been received, the suspect electrical outlet to an on state.

9. The power distribution apparatus of claim 1, wherein the current characteristic is representative of a half-cycle root mean square (RMS) current.

10. The power distribution apparatus of claim 1, wherein the current characteristic is representative of a peak current.

11. A method for monitoring a plurality of electrical outlets of a power distribution apparatus, each of the plurality of electrical outlets being adapted to provision power to an associated electronic device and including an associated current sensor, the method comprising:
receiving a signal that represents current from each associated current sensor;
computing, using at least one processor of the power distribution apparatus and based on the signal, a current characteristic for each associated current sensor;
detecting, using the at least one processor, a trip event associated with at least one overcurrent protection device based on a signal that represents voltage from at least one voltage sensor; and
determining, using the at least one processor, whether at least one computed current characteristic exceeds a selected threshold prior to a detection of the trip event.

12. The method of claim 11, further comprising:
determining that a respective current characteristic exceeds the selected threshold prior to detection of the trip event;
identifying a suspect electrical outlet corresponding to the respective current characteristic; and
providing, on the power distribution apparatus, a perceptible indication of the suspect electrical outlet.

13. The method of claim 12, wherein the perceptible indication is provided on a display on the power distribution apparatus.

14. The method of claim 12, wherein the perceptible indication is provided via one or more light emitting diodes (LEDs) on the power distribution apparatus.

15. The method of claim 11, wherein the current characteristic is representative of a half-cycle root mean square (RMS) current or a peak current.

16. A power distribution apparatus, comprising:
a housing;
a power inlet;
a plurality of electrical outlets, wherein each of the plurality of electrical outlets (a) is adapted to provision power to an associated electronic device and (b) comprises an associated current sensor;
at least one overcurrent protection device; and
at least one processor coupled to the at least one overcurrent protection device and each associated current sensor, said at least one processor configured to:
receive a signal that represents current from each associated current sensor;
compute, based on the signal, a current characteristic for each associated current sensor;
detect a trip event associated with the at least one overcurrent protection device; and
determine whether at least one computed current characteristic exceeds a selected threshold prior to detection of the trip event, whereby upon determining that a computed current characteristic exceeds the selected threshold prior to detection of the trip event, the at least one processor being further configured to:
identify a suspect electrical outlet or its suspect electronic device corresponding to the respective current characteristic;
transmit, to a location remote from the power distribution apparatus, an identifier associated with the suspect electrical outlet; and
transmit, to the location remote from the power distribution apparatus, a waveform capture corresponding to the signal from the at least one said associated current sensor.

17. A power distribution apparatus, comprising:
a housing;
a power inlet;
a plurality of electrical outlets, wherein each of the plurality of electrical outlets (a) is adapted to provision power to an associated electronic device and (b) comprises an associated current sensor;
at least one overcurrent protection device; and
at least one processor coupled to the at least one overcurrent protection device and each associated current sensor, said at least one processor configured to:
receive a signal that represents current from each associated current sensor;
compute, based on the signal, a current characteristic for each associated current sensor;
detect a trip event associated with the at least one overcurrent protection device; and
determine whether at least one computed current characteristic exceeds a selected threshold prior to detection of the trip event; and
at least one voltage sensor, wherein detecting the trip event associated with the at least one overcurrent protection device is based on a signal that represents voltage from the at least one voltage sensor.

18. The power distribution apparatus of claim 4, wherein the selected percentage is 75%.

* * * * *